Sept. 2, 1941.  M. L. WEISER  2,254,462
METHOD OF CREATING DEPTH AND TEXTURE EFFECTS IN ANIMATED CARTOONS
Filed Nov. 21, 1939  2 Sheets-Sheet 1

MARY LOUISE WEISER
INVENTOR

Sept. 2, 1941.      M. L. WEISER      2,254,462
METHOD OF CREATING DEPTH AND TEXTURE EFFECTS IN ANIMATED CARTOONS
Filed Nov. 21, 1939      2 Sheets-Sheet 2

Mary Louise Weiser
Inventor

Patented Sept. 2, 1941

2,254,462

UNITED STATES PATENT OFFICE 2,254,462

METHOD OF CREATING DEPTH AND TEXTURE EFFECTS IN ANIMATED CARTOONS

Mary Louise Weiser, Los Angeles, Calif., assignor to Walt Disney Productions, Los Angeles, Calif., a corporation of California Application November 21, 1939, Serial No. 305,480

6 Claims. (Cl. 41—21)

The present invention relates to improvements in the production of animated cartoons and is particularly directed to methods whereby effects of depth and texture may be created.

Heretofore the customary method of making animated cartoons involved the steps of drawing characters or objects on sheets of paper, these original drawings being then traced onto sheets of nitrated cellulose, cellulose acetate, or other transparent material. In the event the final photoplay was to be in monochrome, these tracings, constituting line drawings only, were then suitably filled with substantially opaque black or gray inks or paints. In the event the completed photoplay was to be in colors, then the reverse side of the transparency on which the line drawings had been made was filled in with suitable colored opaque paints. To the eye of the camera, these transparencies or cells appeared to carry a line drawing of an object or image, various spaces or areas between lines in such drawing carrying colors, but the colors in any given area or portion of the completed image were flat so that in effect the object appeared to be a little cut-out or poster with no roundness or shading.

Furthermore, the paints being employed were flat paints and were applied smoothly so as to produce a smooth, even, substantially polished appearance. During actual photography, these individual cells were placed over other cells depicting other characters, images, backgrounds or foregrounds, so that, to the eye of the camera, the various cells formed a completed picture, the opaque portions of cells in the foreground obliterating and masking portions of objects or images carried on cells in the background.

The present invention is primarily directed toward a method of operation which permits the completed photoplay to create the effect of depth and texture in the scene or in individual objects. For example, a small animal such as a rabbit, chipmunk or the like, is ordinarily provided with fur but in animated cartoons the outline of an animal of this type was depicted by means of a definite unbroken line, the line being generally darker than the color of the body of the animal. As a result, these prior animated cartoons created a mosaic or stained glass effect in that the various objects or portions thereof were outlined with unbroken solid lines. In comparison with this previous procedure, the present invention permits the animals to be so represented that the softness and indefinite outline of fur is created, thereby producing an effect of roundness, depth and texture which renders the representations much more realistic, artistic and pleasant.

An object of the present invention, therefore, is to disclose and provide methods of animation adapted to create the effects of depth and texture.

A further object of the invention is to describe and provide methods of applying paints, lacquers and other coloring compositions to transparencies in a manner adapted to create effects of roundness, texture and depth.

Other objects will become apparent to those skilled in the art from the following description. For purposes of illustration and explanation, reference will be had to the appended drawings, in which.

Figure 1:
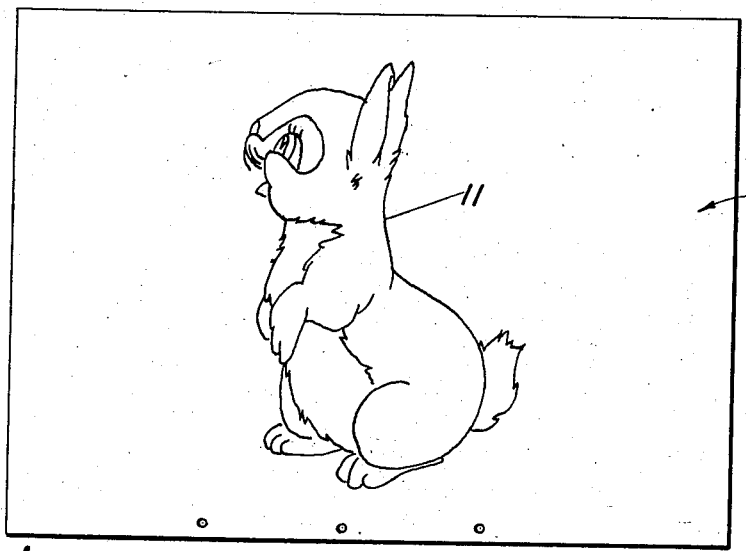
Fig. 1 represents a cell on which an outline drawing has been made.

As stated hereinabove, original drawings are ordinarily prepared on paper by artists and these drawings are then traced onto cells made of a transparent material such as cellulose. A tracing made upon a sheet of cellulose is illustrated in Fig. 1, the transparent sheet being indicated at 10 and the outline of the object, in this instance a rabbit, indicated at 11. The outline 11 may be formed in any suitable manner. When traced, this outline may be in ink of a desired color or it may be made with pencils of a waxy composition carrying suitable pigments. Generally, such pencils should contain pigments, dyes and a suitable blend of relatively soft waxes. In some instances, the outline 11 shown on the transparent material 10 may be obtained by a photographic process as described in a co-pending application filed by William E. Garity, Serial No. 241,202.

Figure 2:
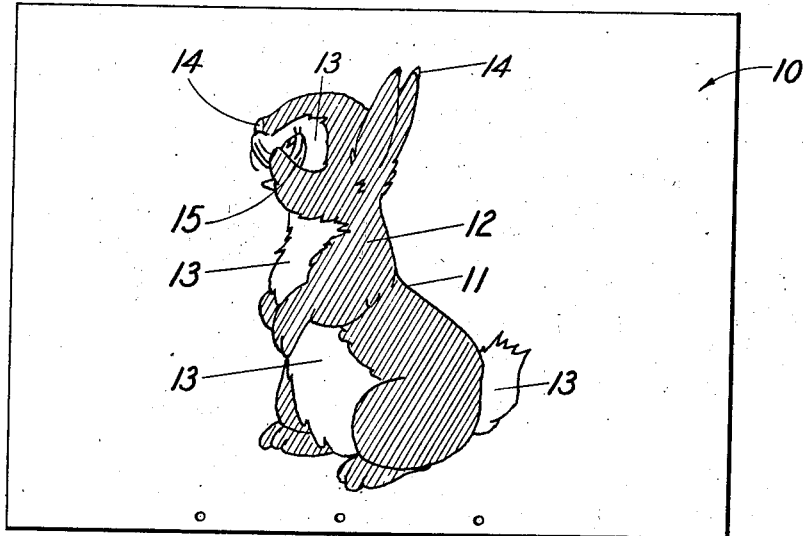
Fig. 2 is the representation of a cell after the cell has had the usual opaque paints applied thereto.
Figure 3:
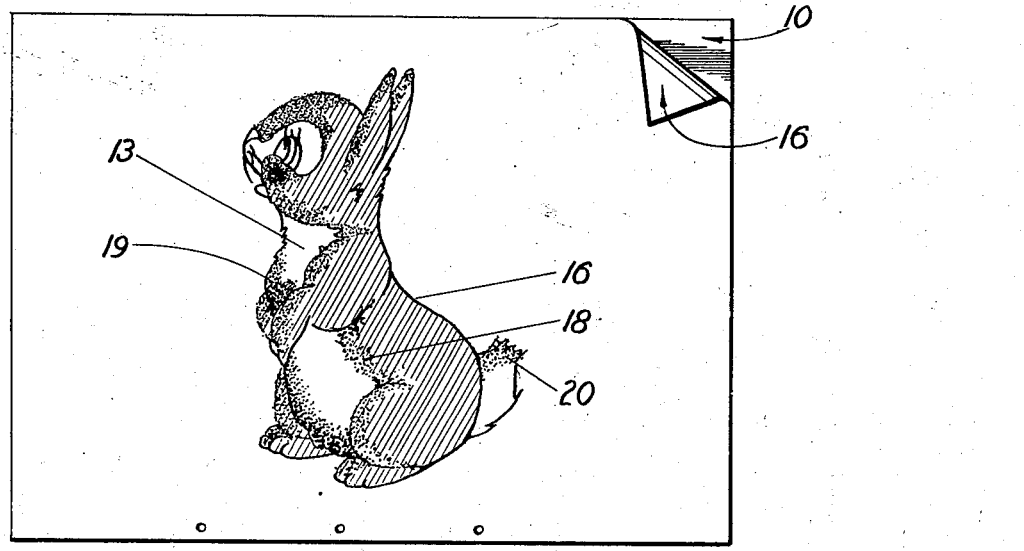
Fig. 3 illustrates one method of imparting depth and texture to the representation carried by the transparency.

Certain areas of the image now carried by the cell 10 are filled in with opaque body paints. These paints are ordinarily applied to the rear of the transparency. As shown in Fig. 2, the cell 10 still carries the outline 11 but desired areas have been filled in with the colored paints which are now visible through the transparent material. During the application of the opaque body paints, the outline is used as a guide. In the illustration given, most of the body has been painted with a light brown, indicated at 12, a much lighter tone being indicated at 13, whereas the nose and ear tips may be painted a creamy pink as at 14. The white areas of this drawing 15, such as the eyeball, may be painted with a white paint. It is to be noted, however, that the drawing is still flat and has no effect of depth or roundness since all of the areas, such as the areas 12, 13 and 14, are of uniform shade.

In carrying out the method of this invention, a second sheet of transparent material may be applied over the cell 10. This second sheet is indicated at 16. The artist now forms an uneven, discontinuously associated coating to edge areas of the outline 11 visible through the transparency 16, this uneven, discontinuously associated, rough, salebrous coating being formed with paints of a desired color or shade which may be either lighter or darker than the shade or color employed in the original image carried by cell 10. These uneven, discontinuously associated areas or coatings are preferably formed with opaque paints (adapted to adhere to the transparent material to which they are applied) and may be formed by applying such paints with a verically directed motion of a porous, spongy carrier for the paints. For example, the artist may employ a bit of sponge rubber of a suitably fine aeriform texture which is lightly coated with the paint and then applied to the sheet 15 along edge areas, such as for example, in superimposition to the outline 11 at 18, 19 and 20. The discontinuous stipple-like coating thus formed preferably extends over a portion at least of the areas underlaid with the continuous, smooth back-up paints 12, 13 and 14.

The separately applied stipple 18, 19, 20 may be of different color than the underlay. For example, even though the breast 13 is a creamy tan, the overlay stipple 19 may be of a pink tone; the overlay 18 may be of a creamy tan tone, however, thereby masking the line of demarcation between the body and belly of the animal and causing a desirable blending of tones.

The combination of the cells 10 and 16 prepared as above described creates an image of a rabbit which has a furry texture and which has an effect of roundness and third dimension which is effectively reproduced when cells prepared in this manner are photographed (in combination with other cells and backgrounds) and prints thereof projected.

Although in the illustration given and referred to hereinabove the discontinuously associated, uneven, rough, stipple-like coating or effect was applied to a separate sheet of transparent material 16, it is to be understood that such rough, stipple-like coating or effect may, if desired, be applied to the front surface of the cell 10 directly.

Figure 4:
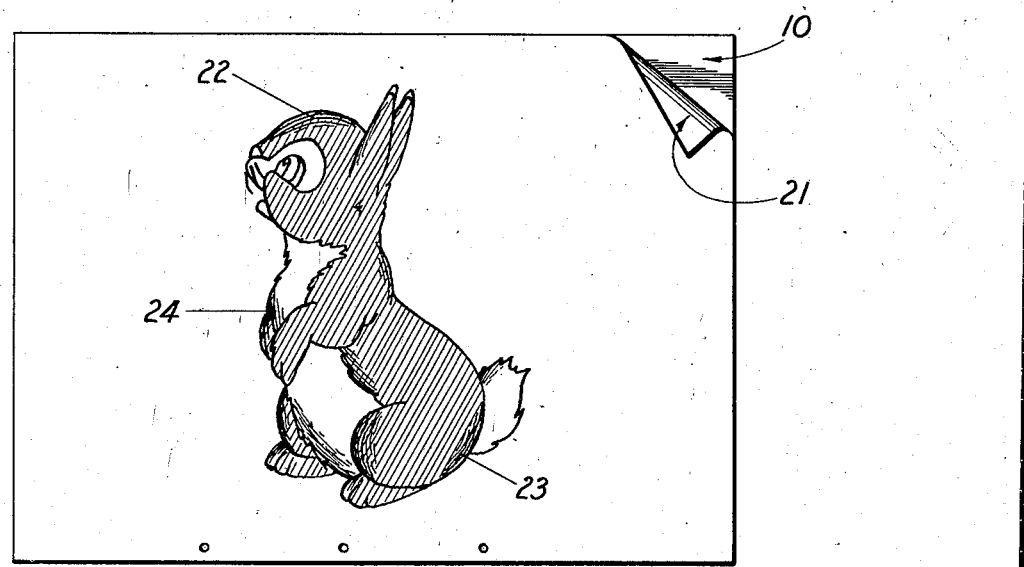
Fig. 4 illustrates another method of procedure embraced by this invention.

Fig. 4 illustrates another method which has been found well adapted for use in creating the desired effect. This figure represents a sheet of transparent material 21 which has been placed over cell 10 and on which sheet 21 an artist has applied certain shade lines or washes by means of a brush, waxy pencil, or other suitable instrument, these washes consisting of lacquers or blends which are substantially transparent but which contain dyes imparting thereto a certain depth of tone. These blends may consist of liquid lacquers or vehicles having solvent properties for the dyes and preferably having a minor solvent action upon the transparency 21 whereby the fixation of the dyes onto the transparency 21 is facilitated. For example, these so-called lacquers or blends may include ethyl alcohol, isopropyl alcohol, or the like, together with a small amount of butyl acetate or any acetate or ester having a solvent effect upon the cellulose of the cell 21. Alcohol soluble dyes of the desired shade are present in these blends or lacquers and the artist applies his shading to the cell or sheet 21 while the same is superimposed over the cell 10 carrying the outline and back paints of the image. These shade lines or blends are indicated at 22, 23 and 24. When the sheet or cell 21, so treated, is placed in superimposed relation to cell 10, it will be found that an effect of roundness and depth has been imparted to the rabbit shown in cell 10, the blend or shade wash 23 imparting roundness to the hind quarters of the rabbit, etc.

As stated hereinbefore, the various blends or shade lines may, if desired, be applied directly to the top surface of the cell 10 instead of being placed on a separate sheet of transparent material.

Moreover, it will be understood that instead of employing substantially transparent liquid lacquers or blends, similar effects may be obtained by using waxy compositions in pencil form or as pastes, such blend pencils containing in addition to their waxes a small quantity of a solvent capable of attacking and exerting a solvent action upon the material from which the cell is constituted, this solvent action affixing the dyes to the cell. These blend pencils or waxy compositions may be applied in a manner similar to that described hereinabove for liquid blends or lacquers. Excess waxy composition may be wiped off, leaving the dye which is now held by the transparency due to the minor solvent action of the solvents or other constituents contained in the pencils.

Those skilled in the art will appreciate that a new art form has been disclosed, permitting animated photoplays to surpass the effect obtainable by the photography of actual living objects and a more artistic and pleasing effect may be obtained, particularly when the photography is in substantially natural colors. Numerous changes, modifications and adaptations can be made and all modifications coming within the scope of the appended claims are embraced thereby.

Although specific reference has been made hereinabove to the use of transparent sheets or carriers, it is to be understood that when desired the sheets may be frosted or provided with sufficient tooth to facilitate the application of dyes, paints, pencils or other media and the sheets then rendered sufficiently transparent for use in the cartooning processes and photography by applying a lacquer or coating thereto. The lacquer or coating will eliminate the frosted or translucent effect and render the sheets transparent. The term "transparent" as used herein is deemed to include carriers which are inherently transparent as well as those which are made transparent in any manner such as, for example, the one indicated here.

I claim:

1. In a method of creating effects of depth and texture in ornamentation, adapted for use in animated cartoon work, the steps of: forming an image of a desired object on a sheet of transparent material by applying substantially opaque paints of desired colors to the rear of such transparent sheet, the edges of said paints forming the outlines of elements of the objects; modifying the color image thus obtained by placing a separate sheet of transparent material over the front of said image, and applying a color-bearing material to said second sheet along desired areas of the underlying image to form discontinuously associated translucent modifying areas adapted to impart depth to the underlying image.

2. In a method of creating effects of depth and texture in ornamentation, adapted for use in animated cartoon work, the steps of: forming an image of a desired object on a sheet of transparent material by applying substantially opaque paints of desired colors to the rear of such transparent sheet, the edges of said paints forming the outlines of elements of the objects; modifying the color image thus obtained by placing a separate sheet of transparent material over the front of said image, and applying a substantially opaque color-bearing material to said second sheet along desired edge areas of the underlying image to form discontinuously associated translucent modifying areas adapted to impart depth to the underlying image and to mask, in part at least, the outlines of the underlying image.

3. In a method of creating effects of depth and texture in ornamentation, adapted for use in animated cartoon work, the steps of: forming an image of a desired object on a sheet of transparent material by applying substantially opaque paints of desired colors to the rear of such transparent sheet, the edges of said paints forming the outlines of elements of the objects; modifying the color image thus obtained by placing a separate sheet of transparent material over the front of said image, and applying a substantially opaque color-bearing material to said second sheet along desired edge areas of the underlying image by gentle pressure of a spongy carrier for said material to form discontinuously associated translucent modifying areas adapted to impart depth to the underlying image and to mask, in part at least, the outlines of the underlying image.

4. In a method of creating effects of depth in ornamentation adapted for use in animated cartoon work, the steps of: forming an image of a desired object on a sheet of transparent material by applying substantially opaque paints of desired colors to the rear of such transparent sheet, the edges of said paints forming the outlines of elements of the object; and then modifying the colored image thus obtained by placing color-bearing material above the front of said image and along selected edge areas thereof, said color-bearing material being of a color complementary to the color of the underlying portion of the image and adapted to impart depth to the underlying image and modify the tone thereof along said selected edge areas.

5. In a method of creating effects of depth in ornamentation adapted for use in animated cartoon work, the steps of: forming an image of a desired object on a sheet of transparent material by applying substantially opaque paints of desired colors to the rear of such transparent sheet, the edges of said paints forming the outlines of elements of the object; and then modifying the colored image thus obtained by placing an excess of translucent color-bearing material above the front of said image and along selected edge areas thereof, said color-bearing material being of a color complementary to the color of the underlying portions of the image, and wiping off the excess whereby the residual material imparts depth to the underlying image and modifies the tone thereof along said selected edge areas.

6. In a method of creating effect of depth in ornamentation, adapted for use in animated cartoon work, the steps of: forming an image in outline on a sheet of transparent material, applying opaque paints of desired colors to desired areas of said image, said paints being applied to the rear of said transparent sheet, and then modifying the colored image thus obtained by applying substantially opaque color-bearing material above the front of said image and along desired edge areas thereof to form discontinuously associated translucent modifying areas adpated to impart depth and texture to the underlying image and to mask, in part at least, the outlines of the underlying image.

MARY LOUISE WEISER.